United States Patent
Kazakov

(10) Patent No.: US 10,761,992 B2
(45) Date of Patent: Sep. 1, 2020

(54) SHARED LOADS AT COMPUTE UNITS OF A PROCESSOR

(71) Applicant: ADVANCED MICRO DEVICES, INC., Santa Clara, CA (US)

(72) Inventor: Maxim V. Kazakov, San Diego, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/176,466

(22) Filed: Oct. 31, 2018

(65) Prior Publication Data

US 2020/0133868 A1 Apr. 30, 2020

(51) Int. Cl.
| | |
|---|---|
| *G06F 12/08* | (2016.01) |
| *G06F 12/0875* | (2016.01) |
| *G06F 17/16* | (2006.01) |
| *G06F 13/16* | (2006.01) |
| *G06F 12/0831* | (2016.01) |

(52) U.S. Cl.
CPC ...... *G06F 12/0875* (2013.01); *G06F 12/0831* (2013.01); *G06F 13/16* (2013.01); *G06F 17/16* (2013.01); *G06F 2212/656* (2013.01); *G06F 2213/16* (2013.01)

(58) Field of Classification Search
CPC ................. G06F 12/08; G06F 13/16
USPC .......................................... 711/118
See application file for complete search history.

(56) References Cited

U.S. PATENT DOCUMENTS

| | | | | |
|---|---|---|---|---|
| 2014/0137124 | A1* | 5/2014 | Szalay | G06F 9/44 718/102 |
| 2014/0337587 | A1* | 11/2014 | Hower | G06F 8/436 711/154 |
| 2015/0334177 | A1* | 11/2015 | Szalay | G06F 9/44 709/201 |
| 2016/0378568 | A1* | 12/2016 | Knox | G06F 9/5083 718/105 |
| 2017/0004080 | A1* | 1/2017 | Wang | G06F 12/084 |
| 2018/0150329 | A1* | 5/2018 | Moudy | G06F 9/5027 |
| 2019/0034326 | A1* | 1/2019 | Nalluri | G06F 12/023 |
| 2019/0361708 | A1* | 11/2019 | Soe | G06F 9/3855 |

\* cited by examiner

*Primary Examiner* — Than Nguyen

(57) ABSTRACT

A processor reduces bus bandwidth consumption by employing a shared load scheme, whereby each shared load retrieves data for multiple compute units (CUs) of a processor. Each CU in a specified group monitors a bus for load accesses directed to a cache shared by the multiple CUs. In response to identifying a load access on the bus, a CU determines if the load access is a shared load access for its share group. In response to identifying a shared load access for its share group, the CU allocates an entry of a private cache associated with the CU for data responsive to the shared load access. The CU then monitors the bus for the data targeted by the shared load. In response to identifying the targeted data on the bus, the CU stores the data at the allocated entry of the private cache.

20 Claims, 5 Drawing Sheets

SHARED LOADS AT COMPUTE UNITS OF A PROCESSOR

BACKGROUND

To enhance processing efficiency, a processor typically employs multiple modules, referred to as compute units (CUs), to execute operations in parallel. For example, a processor can employ a graphics processing unit (GPU) to execute graphics and vector processing operations. To support efficient execution of these operations, the GPU includes multiple CUs to execute the operations in parallel. However, communication and bus bandwidth for the CUs can impact the overall efficiency of the processor. For example, in the course of executing the graphics and vector processing operations the CUs frequently store and retrieve data from a memory hierarchy connected to the CUs via a communication fabric, such as a bus. The communication traffic supporting these data transfers can consume an undesirably large portion of the communication fabric's available bandwidth, thereby reducing overall processing efficiency at the GPU.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-6 illustrate techniques for reducing bus bandwidth consumption at a processor by employing a shared load scheme, whereby each shared load retrieves data for multiple compute units of a processor. Each CU in a specified group, referred to herein as the share group, monitors a bus for load accesses directed to a cache shared by the multiple CUs. In response to identifying a load access on the bus, a CU determines (e.g., based on control data included with the load access) if the load access is a shared load access for its share group. In response to identifying a shared load access for its share group, the CU allocates an entry of a private cache associated with the CU for data responsive to the shared load access. The CU then monitors the bus for the data targeted by the shared load. In response to identifying the targeted data on the bus, the CU stores the data at the allocated entry of the private cache.

By employing shared loads, the processor reduces the number of load accesses, and corresponding responsive data, placed on the bus, thereby reducing consumption of the bus bandwidth. To illustrate via an example, the CUs of a processor GPU sometimes perform a matrix multiplication, wherein multiple CUs will perform operations on the same matrix segment (column or row), requiring each CU to have a copy of the segment in its private cache. Conventionally, to retrieve the matrix segment from the shared cache to its corresponding private cache, each CU generates its own load access targeting the matrix segment and places the load access on the bus, and the shared cache responds to each load access by placing a separate copy of the matrix segment on the bus. In contrast, by employing the techniques described herein, multiple CUs are provided the matrix segment based on a single load request and a single copy of the matrix segment placed on the bus, thereby reducing consumption of the bus bandwidth as well as reducing fetch latency for the shared data.

For FIGS. 1-6, the techniques are described with respect to example implementations at a GPU of a processor. However, it will be appreciated that the in some embodiments the techniques described herein are implemented at other modules of a processor that employ multiple CUs.

Figure 1:
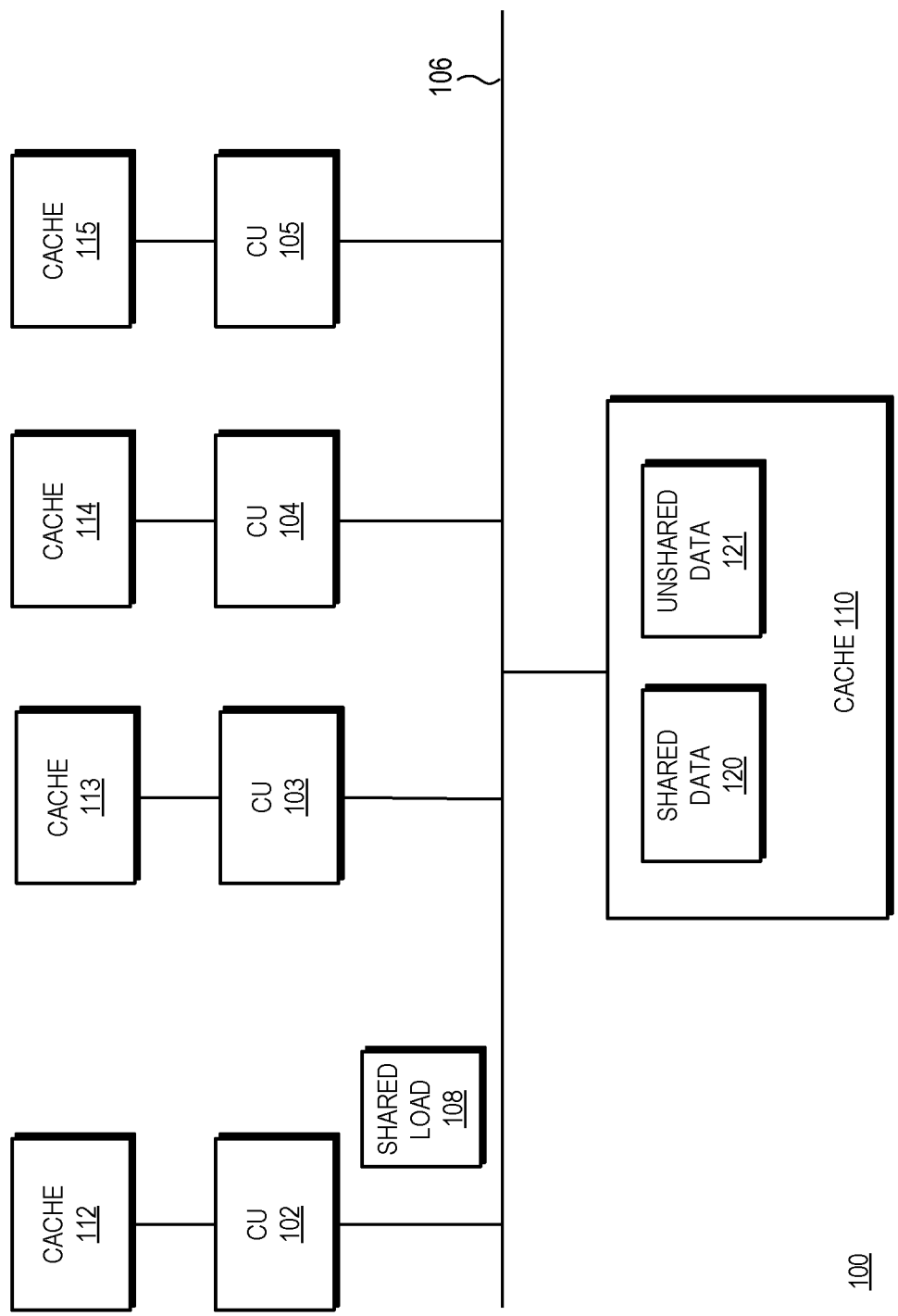
FIG. 1 is a block diagram of a graphics processing unit (GPU) employing shared load operations among a plurality of compute units in accordance with some embodiments.

FIG. 1 illustrates a GPU 100 of a processor that employs shared loads in accordance with some embodiments. In at least one embodiment, the GPU 100 is part of a processor that is generally configured to execute sets of instructions in order to carry out operations on behalf of an electronic device. Accordingly, in different embodiments the GPU 100 is part of an electronic device such as a desktop or laptop computer, a server, a handheld electronic device such as a smartphone or tablet, a game console, and the like. The GPU 100 is generally configured to execute graphics and vector processing operations on behalf of the processor. For example, in some embodiments, a central processing unit (CPU, not shown at FIG. 1) of the processor provides the GPU with sets of operations for execution, whereby the sets of operations are associated with graphics or vector processing.

To facilitate execution of the provided operations, the GPU 100 includes a plurality of CUs, designated CUs 102-105. Each of the CUs 102-105 is configured to execute assigned operations independently of, and concurrent with, the other CUs to allow the GPU 100 to execute complex operations, such as matrix multiplication, relatively quickly. Accordingly, in some embodiments, each of the CUs 102-105 includes a plurality of Single-Instruction Multiple-Data (SIMD) processing units, fetch and decode logic to fetch and decode instructions for the SIMD units, a register file to store operands for the SIMD units, and the like.

To further support execution of operations, the GPU 100 includes a memory hierarchy to store data for use by the CUs 102-105. In the illustrated embodiment, the memory hierarchy includes a set of private caches, designated caches 112-115, and a shared cache 110. The caches 112-115 are level 1 (L1) caches for the CUs 102-105, respectively, and are private caches in that each of the caches 112-115 is only directly accessible by its corresponding CU 102-105. The cache 110 is a level 2 (L2) cache that is the next level of the memory hierarchy above the L1 caches 112-115, and is a shared cache in that the cache 110 is accessible by each of the caches 102-105. In some embodiments, the memory hierarchy of the GPU 100 includes additional levels above the cache 110, such as a level 3 (L3) cache and, above the L3 cache, a main memory external to the GPU 100."

To support access to the cache 110, the GPU 100 includes a bus 106 connecting the cache 110 to each of the CUs 102-105. Although the bus 106 is illustrated as a simple bus, it will be appreciated that in other embodiments the bus 106 corresponds to more complex communication fabrics. The bus 106 is generally configured to carry messages between the cache 110 and the CUs 102-105, including memory access requests and data responsive to such requests, as described further herein. The bus 106 is able to carry a limited amount of information for a given unit of time, wherein this amount is generally referred to as the bandwidth of the bus.

During execution of operations, each of the CUs 102-105 accesses data at the cache 110 by generating memory access requests. For example, in response to determining that a required unit of data is not stored at the corresponding private cache 112-115, the respective CU generates a memory access request to access the data at the cache 110. Types of memory access requests include write requests (also referred to as store requests) to store data at the cache 110, and load requests (also referred to as read requests) to retrieve data from the cache 110.

To reduce the impact of load requests, and data responsive thereto, on the bandwidth of the bus 106, the GPU 100 supports shared load requests. To illustrate, the cache 110 stores two types of data, designated shared data 120 and unshared data 121. Shared data 120 is data that is expected to be required by more than one of the CUs 102-105. For example, in some embodiments the shared data 120 is one or more segments of a matrix upon which multiple ones of the CUs 102-105 are to conduct mathematical operations. Unshared data 121 is data that is not expected to be required by more than one of the CUs 102-105 for concurrent use.

In some embodiments, in response to receiving a wavefront or other set of operations, along with corresponding data, from a CPU, the CUs 102-105 (or other module of the GPU 100) identify which portions of the received data are shared data and which portions are unshared data, and maintain a record of memory addresses corresponding to each data type—that is, a record of memory addresses associated with shared data and a record of memory addresses associated with unshared data.

In addition, in some embodiments, the CUs 102-105 (or other GPU module) identify which of the CUs 102-105 require which portions of the shared data, and assigns the CUs 102-105 to share groups corresponding to the identified portions of shared data. For example, in response to receiving a matrix multiply operation, the GPU 100 identifies which of the CUs 102-105 require a particular segment (row or column) of the matrix to perform the corresponding portion of the multiply operation, and assigns the identified CUs to the share group for that matrix segment.

In operation, when generating a load request, the corresponding CU identifies whether the load request targets a portion of the shared data 120 or a portion of the unshared data 121. If the load request targets a portion of the unshared data 121, the CU generates an unshared load request and communicates the unshared load request to the cache 110. In response, the cache 110 retrieves the data targeted by the unshared load request, as indicated by the memory address of the request, and provides the data to the requesting CU via the bus 106.

In response to determining that the load request targets a portion of the shared data 120, the CU generates a shared load request (e.g. shared load request 108) and places the shared load request on the bus 106 for transmission to the cache 110. In at least one embodiment, each load request includes a header or other portion including control information indicating whether the load request is a shared load request or an unshared load request. Each CU monitors the bus for shared load requests. In response to identifying a shared load request, a CU identifies whether the CU is part of the share group associated with the data targeted by the shared load request. If so, the CU allocates an entry of the corresponding private cache 112-115 to store the data targeted by the load request. The CU thereby ensures that the corresponding cache has an entry to store the data when it is retrieved from the cache 110. In other embodiments, such as described below with respect to FIG. 6, the GPU 100 includes a dedicated bus for shared load requests or notifications, and each of the CUs 102-105 monitors the dedicated bus for shared load requests and responsive data.

In response to receiving a shared load request, the cache 110 retrieves the targeted data and places the data on the bus 106 for transmission to the requesting CU (the CU that generated the shared load request). Each CU that allocated an entry for the data retrieves the data from the bus and stores the data at the allocated entry. Thus, each CU in the share group is provided the data without each generating its own load request for the data, reducing overall the number of load access requests communicated via the bus 106 as well as reducing data fetch latency. That is, because the shared data is effectively prefetched to the caches in the share group, when a CU in the share group generates a request for the data, the data will be present in the corresponding local cache, thereby reducing access latency.

In some embodiments, the cache 110 stores information indicating the share group for each unit (e.g., cache line) of shared data. In response to retrieving shared data, the cache 110 places the shared data on the bus 106 along with address information indicating the CUs that are to receive the shared data. The bus 106 routes the shared data to only the indicated CUs, rather than to all the CUs, thereby improving bus utilization.

Figure 2:
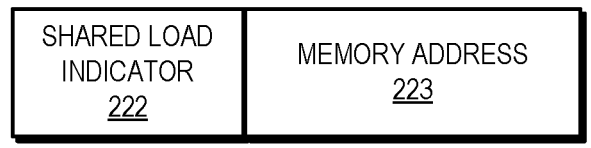
FIG. 2 is a block diagram of shared load request at the GPU of FIG. 1 in accordance with some embodiments.

FIG. 2 illustrates an example of a load request 220 generated by one of the CUs 102-105 of FIG. 1 in accordance with some embodiments. The load request 220 includes a shared load indicator 222 and a memory address field 223. The memory address field 223 indicates the memory address of the data targeted by the load request. The shared load indicator 222 stores information indicating the type of load request—that is, whether the load request 220 is a shared load request or an unshared load request. In some embodiments, the shared load indicator 222 is a single bit that, when set, indicates that the load request is a shared load request. In these embodiments, all of the CUs 102-105 are part of the same share group, such that any shared load request transfers data to each of the caches 112-115. In other embodiments, the shared load indicator 222 includes share group information indicating the share group with which the targeted data is shared. For example, in some embodiments the shared load indicator identifies a column or row of a matrix, and all CUs requiring that column or row for operations is included in the share group for the column or row.

Figure 3:
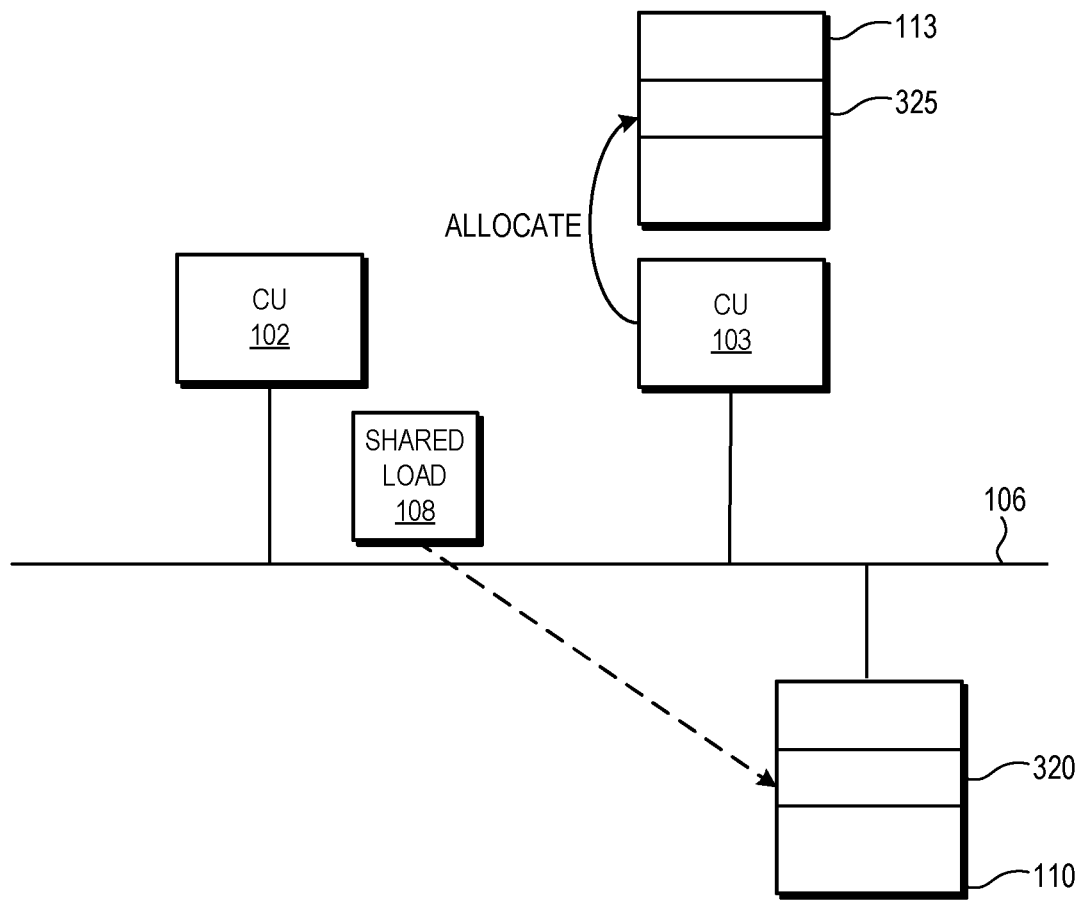
FIG. 3 is a block diagram illustrating an example of a shared load being issued by a CU of the GPU of FIG. 1 in accordance with some embodiments.

FIG. 3 is a block diagram illustrating an example of a CU of the GPU 100 issuing a shared load in accordance with some embodiments. In the illustrated example, the CU 102 issues the shared load 108, targeting data stored at entry 320 of the shared cache 110. The CU 103 is monitoring the bus 106 for load requests and therefore detects the shared load 108. In some embodiments, the CU 103 detects the shared load by reading one or more bits of the shared load identifier 222 (FIG. 2) of each load request placed on the bus by a CU.

In response to the one or more bits of the shared load indicator matching a predefined value, the CU 103 identifies a load access as a shared load.

In some embodiments, in response to identifying the shared load 108 as a shared load, the CU 103 determines if it is part of the share group for the shared load 108. For example, in some embodiments the shared load 108 indicates the column of a matrix, and the CU 103 identifies that it is assigned to perform operations using the matrix column. The CU 103 therefore determines that it is part of the share group for the shared load 108.

In response to determining that the shared load 108 is a shared load and that it is part of the share group for the shared load 108, the CU 103 allocates an entry 325 of the cache 113 to store data responsive to the shared load 108. In some embodiments, the CU 103 allocates the entry 325 according to a specified cache allocation scheme. For example, the CU 103 evicts the least recently used entry of the cache 113, at entry 325, and sets a valid bit for the entry 325. By setting the valid bit, the entry 325 appears to be an entry that is in use, and therefore not available to store data that is responsive to a different memory access than the shared load 108.

Figure 4:
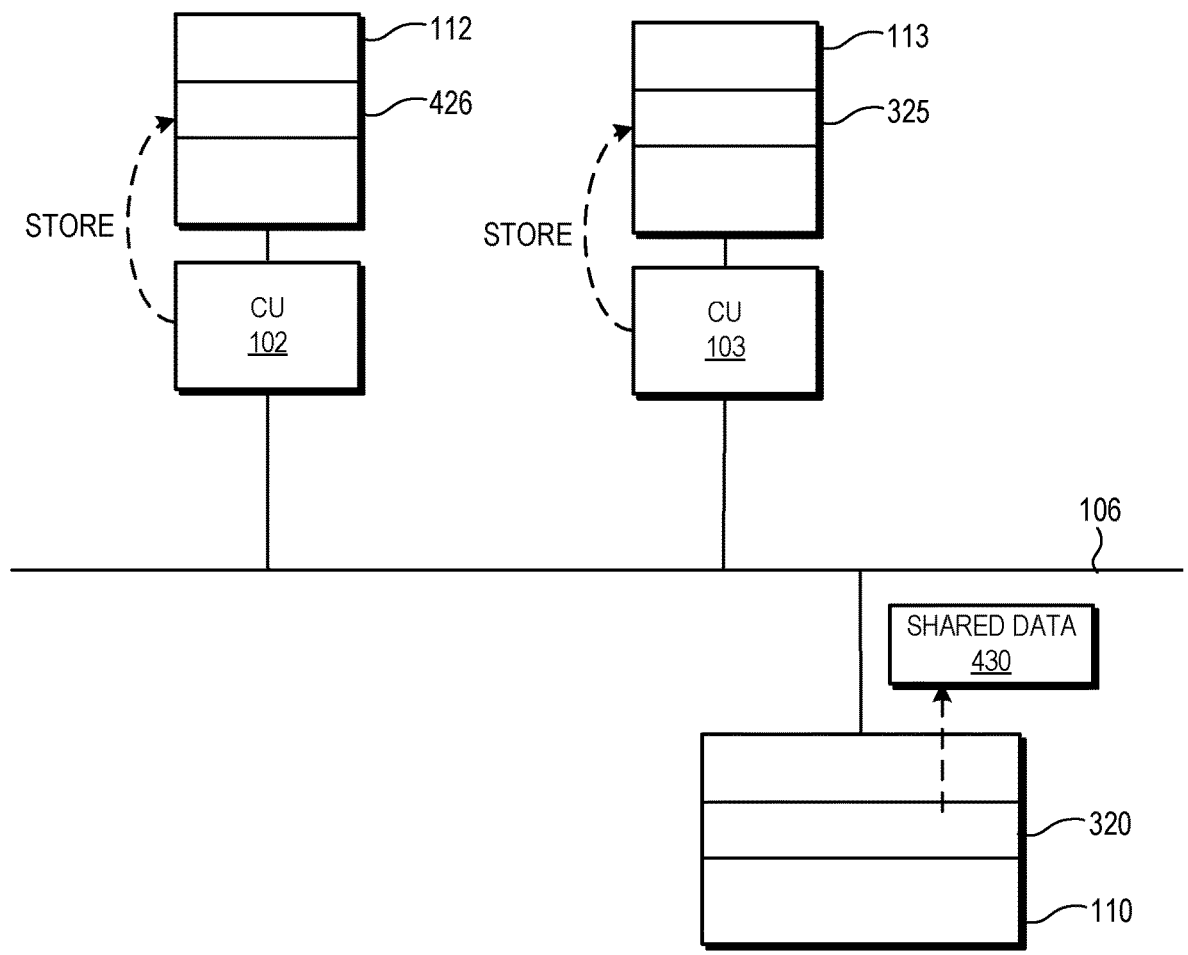
FIG. 4 is a block diagram illustrating an example of a response to the shared load of FIG. 3 in accordance with some embodiments.

FIG. 4 illustrates a block diagram of an example of the cache 110 responding to the shared load access 108, as described with respect to FIG. 3, in accordance with some embodiments. In the illustrated example, the cache 110 responds to the shared load access 108 by placing the data stored at the entry 320, designated shared data 430, on the shared bus 106. The CU 102 that issued the shared load 108 is monitoring the bus 106 for the responsive shared data 430. In response to detecting that the cache 110 has placed the shared data 430 on the bus, the CU 102 allocates an entry 436 of the cache 112 to store the shared data 430. The CU 102 then stores a copy of the shared data 430 at the allocated entry 436.

In addition, in response to detecting the shared load 108 as described above with respect to FIG. 3, the CU 103 monitors the bus 106 for the shared data 430. In response to detecting that the cache 110 has placed the shared data 430 on the bus, the CU 103 stores a copy of the shared data 430 at the entry 325 of the cache 113, previously allocated as described above with respect to FIG. 3. Thus, as illustrated by the examples of FIGS. 3 and 4, a single shared load request, and single response by the cache 110, results in the shared data 430 being provided to multiple CUs and stored at multiple private caches of the CUs 102-105. In contrast, a conventional GPU requires separate load requests, and separate responses, for each private cache, resulting in increased use of bus bandwidth.

It will be appreciated that FIGS. 3 and 4 depict just one example of processing a shared load request. In some embodiments, the shared load request provides data to multiple other CUs. For example, in some embodiments, each of the CUs 103-105 are in the share group for the shared load request 108, and therefore each of the CUs 103-105 stores a copy of the shared data 430 at the respective private cache 113-115 in response to the shared load request 108.

Figure 5:
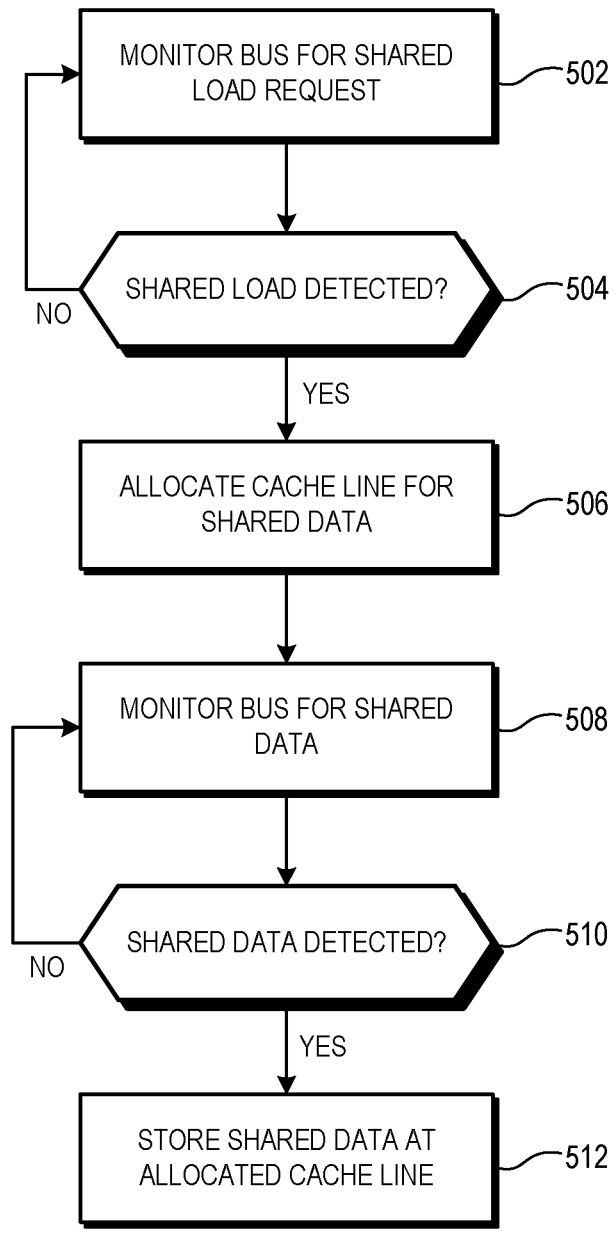
FIG. 5 is a flow diagram of a method of implementing shared load operations at a GPU in accordance with some embodiments.

FIG. 5 illustrates a flow diagram of a method 500 of implementing shared load operations at a GPU in accordance with some embodiments. The method 500 is described with respect to an example implementation at the GPU 100 of FIG. 1. At block 502, the CU 103 monitors the bus 106 for a shared load request. At block 504 the CU 103 determines if a shared load has been placed on the bus 106 by another CU and, if so, if the CU 103 is part of the share group for the shared load, as indicated by the shared load identifier 222 (FIG. 2). If a shared load has not been placed on the bus 106, or if the CU 103 is not part of the share group for a shared load that has been placed on the bus 106, the method flow returns to block 502.

If, at block 504, the CU 103 determines that a shared load request has been placed on the bus 106, and that the CU 103 is part of the share group for the shared load request, the method flow proceeds the block 506 and the CU 103 allocates an entry of the cache 113 to store data responsive to the shared load request. The method moves to block 508 and the CU 103 monitors the bus 106 for the shared data that is responsive to the shared load request detected at block 504.

At block 510, the CU 103 determines if it has detected the shared data that is responsive to the shared load request. If not, the method returns to block 508 and the CU 103 continues to monitor the bus 106 for the shared data. In response to detecting the shared data on the bus 106, the method flow proceeds to block 512 and the CU 103 stores the shared data at the entry of the cache 113 that was allocated at block 506.

Figure 6:
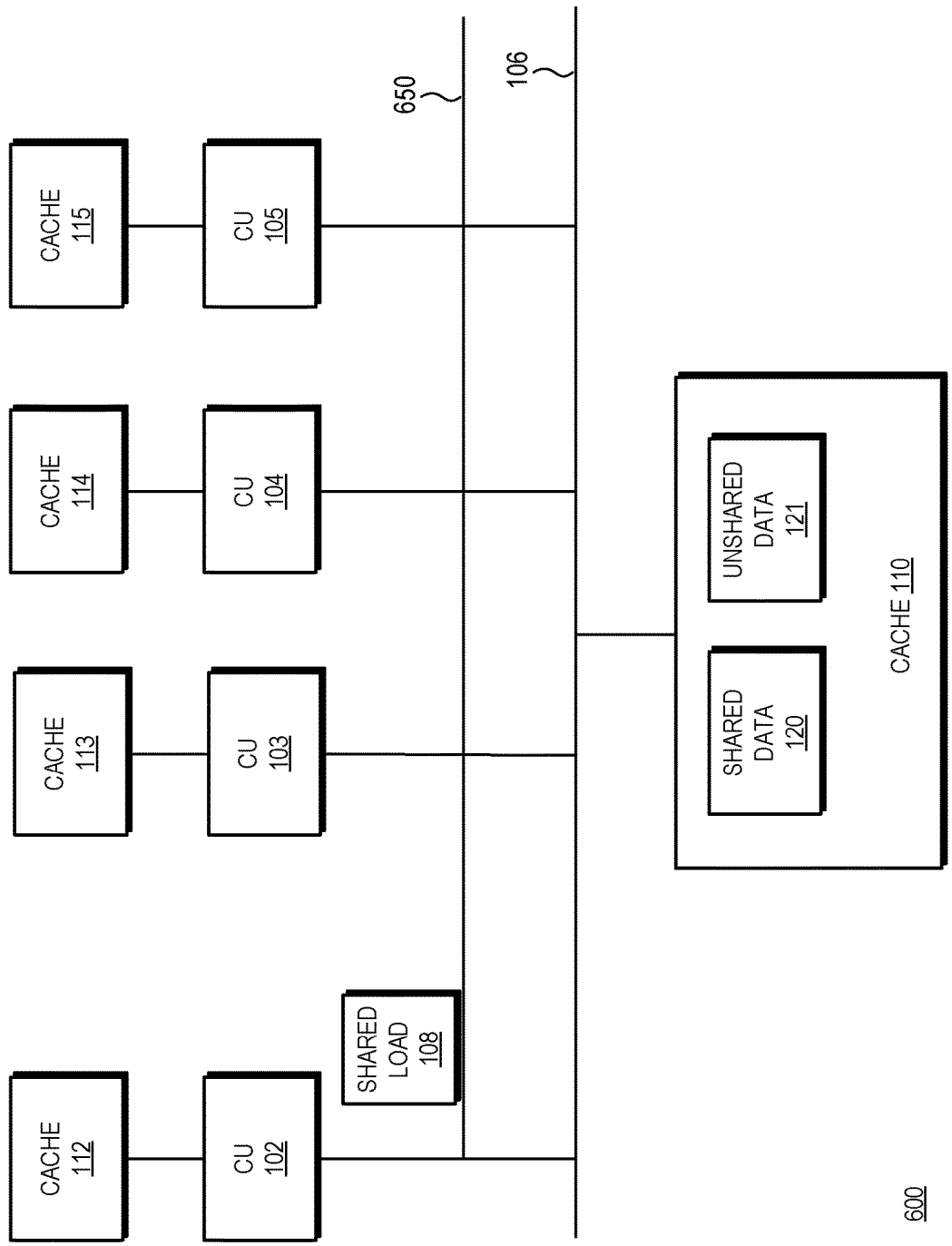
FIG. 6 is a block diagram of a GPU employing a dedicated bus for shared load notifications in accordance with some embodiments.

FIG. 6 illustrates a block diagram of a GPU 600 that employs a dedicated bus for shared load requests in accordance with some embodiments. In the depicted example, the GPU 600 is similar to the GPU 100 of FIG. 1. For example, the GPU 600 includes CUs 102-105, private caches 112-115, cache 110, and a bus 106, each of which operate similarly to the corresponding modules of FIG. 1. However, the GPU 600 also includes a bus 650 that is dedicated to carrying shared load requests between the CUs 102-105 and the cache 110. Each of the CUs 102-105 monitor the shared load bus 650 for shared load requests (e.g., shared load 108) and, in response to detecting a shared load for the corresponding share group, allocates an entry at the corresponding private cache as described above.

In some embodiments, the bus 650 does not carry the shared load requests themselves, but instead is a dedicated notification bus that carries notifications of shared loads received by the cache 110. In response to receiving a shared load request, the cache 110 identifies the CUs in the share group for the shared load request and notifies the identified CUs of the shared load via the bus 650. In response, the notified CUs allocate an entry at the corresponding private cache as described above and monitor the bus 106 for the data responsive to the shared load request.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    at a first compute unit of a processor, monitoring a bus for a shared load request to a memory device issued by a different compute unit of the processor, wherein the memory device is separate from the first compute unit; and
    in response to detecting, at the first compute unit, a first shared load request issued to the memory device by a second compute unit of the processor, allocating a first entry of a first dedicated cache of the first compute unit to store data from the memory device responsive to the first shared load request.

2. The method of claim 1, further comprising:
    in response to detecting the first shared load request, monitoring the bus for the data from the memory device responsive to the first shared load request.

3. The method of claim 2, further comprising:
    in response to detecting the data from the memory device responsive to the first shared load request, storing the data at the allocated first entry of the first dedicated cache.

4. The method of claim 1, wherein detecting the first shared load request comprises detecting the first shared load request based on an identifier in a memory access request issued to the memory device by the second compute unit.

5. The method of claim 4, wherein the identifier comprises a group identifier identifying a plurality of compute units of the processor.

6. The method of claim 5, wherein the group identifier identifies at least one of a column and a row of a matrix for a matrix multiplication operation implemented at the plurality of compute units.

7. The method of claim 6, wherein detecting the first shared load request comprises detecting the first shared load request in response to matching the at least one of a column and a row of the matrix with a matrix column or row assigned to the first compute unit.

8. The method of claim 1, further comprising:
    receiving, at the first compute unit, a notification of the first shared load request from a shared cache.

9. The method of claim 1, wherein the bus is a dedicated notification bus for shared loads.

10. A method, comprising:
    at a first compute unit of a processor, monitoring a bus for data responsive to a shared load request issued by a second compute unit of the processor to a memory device, wherein the memory device is separate from the first compute unit; and
    in response to detecting, at the first compute unit, the data from the memory device responsive to the shared load request, storing the data at a first dedicated cache of the first compute unit and a second dedicated cache of the second compute unit.

11. The method of claim 10, further comprising:
    allocating an entry of the first dedicated cache in response to detecting the shared load request on the bus.

12. A processor comprising:
    a bus;
    a plurality of compute units coupled to the bus, the plurality of compute units including a first compute unit and a second compute unit;
    a shared cache coupled to the bus; and
    wherein the first compute unit is configured to:
        monitor the bus for a shared load request issued to a memory device by another compute unit of the plurality of compute units, wherein the memory device is separate from the first compute unit; and
        in response to detecting a first shared load request issued by the second compute unit to the memory device, allocate a first entry of a first dedicated cache of the first compute unit to store data from the memory device responsive to the first shared load request.

13. The processor of claim 12, wherein the first compute unit is configured to:
    in response to detecting the first shared load request, monitor the bus for the data from the memory device responsive to the first shared load request.

14. The processor of claim 12, wherein the first compute unit is configured to:
    in response to detecting the data from the memory device responsive to the first shared load request, store the data at the allocated first entry of the first dedicated cache.

15. The processor of claim 12, wherein the first compute unit is configured to detect the first shared load request based on an identifier in a memory access request issued to the memory device by the second compute unit.

16. The processor of claim 15, wherein the identifier comprises a group identifier identifying a plurality of compute units of the processor.

17. The processor of claim 16, wherein the group identifier identifies at least one of a column and a row of a matrix for a matrix multiplication operation implemented at the plurality of compute units.

18. The processor of claim 17, wherein the first compute unit is configured to detect the first shared load request in response to matching the at least one of a column and a row of the matrix with a matrix column or row assigned to the first compute unit.

19. The processor of claim 12, wherein the first compute unit is configured to:

in response to detecting a second shared load request issued to the memory device by a third compute unit of the processor, allocate a second entry of the first dedicated cache to store data from the memory device responsive to the second shared load request.

20. The processor of claim 12, wherein the second compute unit is configured to:
monitor the bus for a shared load request issued to the memory device by a different compute unit of the processor, wherein the memory device is separate from the second compute unit; and in response to detecting a second shared load request issued to the memory device by the first compute unit of the processor, allocate a second entry of a second dedicated cache of the second compute unit to store data from the memory device responsive to the second shared load request.

* * * * *